(12) United States Patent
Foody (10) Patent No.: US 12,134,731 B2
(45) Date of Patent: Nov. 5, 2024

(54) COMPRESSIBLE CEMENTITIOUS COMPOSITIONS, SUBTERRANEAN SYSTEMS, AND METHODS OF INCORPORATING CEMENTITIOUS COMPOSITIONS INTO SUCH SYSTEMS

(71) Applicant: Kevin Foody, Pittsburgh, PA (US)

(72) Inventor: Kevin Foody, Pittsburgh, PA (US)

( * ) Notice: Subject to any disclaimer, the term of this patent is extended or adjusted under 35 U.S.C. 154(b) by 184 days.

(21) Appl. No.: 17/667,616

(22) Filed: Feb. 9, 2022

(65) Prior Publication Data

US 2022/0251436 A1 Aug. 11, 2022

Related U.S. Application Data

(60) Provisional application No. 63/147,439, filed on Feb. 9, 2021.

(51) Int. Cl.
*C09K 8/467* (2006.01)
*C04B 18/22* (2006.01)
*C04B 28/04* (2006.01)
*E21D 11/10* (2006.01)

(52) U.S. Cl.
CPC .............. *C09K 8/467* (2013.01); *C04B 18/22* (2013.01); *C04B 28/04* (2013.01); *E21D 11/105* (2013.01)

(58) Field of Classification Search
CPC ......... C09K 8/467; C04B 18/22; C04B 28/04; E21D 11/105
See application file for complete search history.

(56) References Cited

U.S. PATENT DOCUMENTS

| | | | |
|---|---|---|---|
| 4,419,135 A * | 12/1983 | Hoge | E21F 15/005 524/6 |
| 5,779,787 A | 7/1998 | Brothers et al. | |
| 6,645,288 B1 | 11/2003 | Dargaud et al. | |
| 6,672,015 B2 | 1/2004 | Cognon | |
| 6,742,592 B1 * | 6/2004 | Le Roy-Delage | C04B 28/02 166/293 |
| 6,846,357 B2 | 1/2005 | Reddy et al. | |
| 6,902,001 B2 | 6/2005 | Dargaud et al. | |
| 6,907,929 B2 | 6/2005 | Leroy-Delage et al. | |
| 7,217,441 B2 | 5/2007 | Bour et al. | |
| 7,351,279 B2 | 4/2008 | Brothers | |

(Continued)

FOREIGN PATENT DOCUMENTS

| CA | 2975614 A1 | 12/2017 |
|---|---|---|
| WO | 2004065321 A1 | 8/2004 |

(Continued)

*Primary Examiner* — Janine M Kreck
(74) *Attorney, Agent, or Firm* — The Webb Law Firm (57) ABSTRACT

A method of incorporating a compressible cementitious composition into a subterranean structure having a tunnel including: (a) incorporating a compressible cementitious composition into annular gaps formed around the tunnel of the subterranean structure, and (b) allowing the compressible cementitious composition to cure to a hardened cementitious material within the annular gaps. Further, the compressible cementitious composition includes: (i) water; (ii) a cementitious material; and (iii) a rubber material, in which the rubber material comprises at least 15 weight % of the composition based on the total weight of the composition. A subterranean system and compressible cementitious composition is also included.

14 Claims, 3 Drawing Sheets

(56) References Cited

U.S. PATENT DOCUMENTS

| | | | |
|---|---|---|---|
| 7,390,356 | B2 | 6/2008 | Kulakofsky et al. |
| 7,470,322 | B2 | 12/2008 | Drochon et al. |
| 8,876,968 | B2 | 11/2014 | Revil et al. |
| 9,382,159 | B2 | 7/2016 | Khalfallah et al. |
| 9,409,821 | B2 | 8/2016 | James |
| 9,676,989 | B2 | 6/2017 | Brenneis et al. |
| 9,771,772 | B2 | 9/2017 | Brothers et al. |
| 9,796,903 | B2 | 10/2017 | Agapiou et al. |
| 9,896,380 | B2 | 2/2018 | Frantz et al. |
| 9,903,184 | B2 | 2/2018 | Chatterji et al. |
| 10,351,753 | B2 | 7/2019 | Agapiou et al. |
| 10,472,554 | B2 | 11/2019 | Bulte-Loyer et al. |
| 10,655,045 | B2 | 5/2020 | Al-Yami et al. |
| 2004/0007360 | A1* | 1/2004 | Leroy-Delage ......... C04B 18/22 166/292 |
| 2005/0096412 | A1 | 5/2005 | Petr et al. |
| 2006/0225622 | A1* | 10/2006 | Brothers ................ C09K 8/473 106/695 |
| 2014/0238676 | A1 | 8/2014 | Carelli et al. |
| 2015/0041134 | A1 | 2/2015 | Carelli et al. |
| 2016/0280981 | A1 | 9/2016 | Danican et al. |
| 2018/0215989 | A1 | 8/2018 | Jain |
| 2018/0230358 | A1 | 8/2018 | Jain |
| 2019/0048249 | A1* | 2/2019 | Dimillo .................. E21D 11/10 |

FOREIGN PATENT DOCUMENTS

| | | |
|---|---|---|
| WO | 2009019471 A1 | 2/2009 |
| WO | 2013078675 A1 | 6/2013 |
| WO | 2016039988 A1 | 3/2016 |
| WO | 2016077634 A1 | 5/2016 |
| WO | 2020009918 A1 | 1/2020 |

\* cited by examiner

COMPRESSIBLE CEMENTITIOUS COMPOSITIONS, SUBTERRANEAN SYSTEMS, AND METHODS OF INCORPORATING CEMENTITIOUS COMPOSITIONS INTO SUCH SYSTEMS

CROSS-REFERENCE TO RELATED APPLICATION

This application claims priority to U.S. Provisional Patent Application No. 63/147,439, filed Feb. 9, 2021, the entire disclosure of which is hereby incorporated by reference in its entirety.

BACKGROUND OF THE INVENTION

Field of the Invention

The present invention relates to compressible cementitious compositions containing rubber materials, subterranean systems containing such compositions, and methods of incorporating the compressible cementitious compositions into gaps formed in the subterranean systems.

Description of Related Art

Subterranean systems comprise underground structures (e.g. boreholes and underground tunnels) formed within the earth using various processes such as, for example, through known tunneling means. These systems commonly include a cementitious material that is incorporated into gaps formed between the subterranean structures and the earth. For example, in tunneling processes, tunnels formed within the earth are lined with a concrete lining material, and then a cementitious material is inserted into the gaps found between the tunnel liner and the tunnel wall.

Typically, subterranean structures are exposed to mechanical forces (e.g. compressive or deformation stresses) from the surrounding earth, which can cause cracking and other damage to the subterranean structures, such as to the cementitious material inserted into the gaps between the tunnel liner and the tunnel wall. For example, the cementitious materials inserted into the gaps between the tunnel liner and the tunnel wall are known to provide unsatisfactory load-deformation characteristics that will crack or otherwise deform in response to mechanical forces.

While considerable efforts have been expended to provide compressible cementitious materials, there is still a need for improved compressible cementitious materials that can also rebound after being exposed to mechanical forces. Accordingly, it would be desirable to provide a cementitious material that exhibits good load-deformation characteristics to prevent cracking or other damage as well as a rebounding effect after being exposed to known mechanical stresses.

SUMMARY OF THE INVENTION

The present invention includes a method of incorporating a compressible cementitious composition into a subterranean structure comprising a tunnel. The method comprises: (a) incorporating a compressible cementitious composition into annular gaps formed around the tunnel of the subterranean structure, and (b) allowing the compressible cementitious composition to cure to a hardened cementitious material within the annular gaps. Further, the compressible cementitious composition comprises: (i) water; (ii) a cementitious material; and (iii) a rubber material in which the rubber material comprises at least 15 weight % of the composition based on the total weight of the composition.

The rubber material can comprise from 40 weight % to 70 weight % of the composition, based on the total weight of the composition. The rubber material can be selected from various rubber materials. For instance, the rubber material can comprise a recycled crumb rubber. Further, the recycled crumb rubber may have a certain diameter such as, for example, a diameter of no more than 0.5 inches.

The cementitious material used to form a portion of the compressible cementitious composition can be selected from the group consisting of Ordinary Portland cement, ground granulated blast furnace slag cement, and a combination thereof. Moreover, the cementitious material can comprise 50 weight % or less of the composition, based on the total weight of the composition. The weight ratio of water to the cementitious material can also be less than 2:1, based on the total weight of the composition.

The compressible cementitious composition can include additional materials, such as fly ash. When fly ash is used, a weight ratio of a combined amount of the cementitious material and the fly ash to an amount of the rubber material can be within a range of from 0.3:1 to 1:1.

The subterranean structure used with the method can comprise various components. For example, the subterranean structure can comprise a tunnel liner formed around the tunnel, and the annular gaps can be formed between the tunnel liner and a tunnel wall surface.

The present invention is also directed to a subterranean system. The subterranean system can comprise a tunnel and a cured compressible cementitious material positioned within annular gaps formed around at least a portion of the tunnel. The compressible cementitious material formed in the annular gaps can be formed from the previously described compressible cementitious composition, which is described in further detail herein.

The present invention further includes the previously described compressible cementitious composition, which is described in further detail herein.

The present invention is also directed to the following clauses.

Clause 1: A method of incorporating a compressible cementitious composition into a subterranean structure comprising a tunnel, the method comprising: (a) incorporating a compressible cementitious composition into annular gaps formed around the tunnel of the subterranean structure; and (b) allowing the compressible cementitious composition to cure to a hardened compressible cementitious material within the annular gaps, wherein the compressible cementitious composition comprises (i) water, (ii) a cementitious material, and (iii) a rubber material in which the rubber material comprises at least 15 weight % of the composition based on the total weight of the composition.

Clause 2: The method of clause 1, wherein the rubber material comprises from 40 weight % to 70 weight % of the composition, based on the total weight of the composition.

Clause 3: The method of clauses 1 or 2, wherein the rubber material comprises a recycled crumb rubber.

Clause 4: The method of clause 3, wherein the recycled crumb rubber has a diameter of no more than 0.5 inches.

Clause 5: The method of any one of the previous clauses, wherein the cementitious material is selected from a group consisting of Ordinary Portland cement, ground granulated blast furnace slag cement, and a combination thereof.

Clause 6: The method of any one of the previous clauses, wherein the cementitious material comprises 50 weight % or less of the composition, based on the total weight of the composition.

Clause 7: The method of any one of the previous clauses, wherein the weight ratio of water to the cementitious material is less than 2:1, based on the total weight of the composition.

Clause 8: The method of any one of the previous clauses, wherein the compressible cementitious composition further comprises fly ash.

Clause 9: The method of clause 8, wherein a weight ratio of a combined amount of the cementitious material and the fly ash to an amount of the rubber material is within a range of from 0.3:1 to 1:1.

Clause 10: The method of any one of the previous clauses, wherein the subterranean structure comprises a tunnel liner formed around the tunnel, and the annular gaps are formed between the tunnel liner and a tunnel wall surface.

Clause 11: A subterranean system comprising: (a) a subterranean structure comprising a tunnel; and (b) a cured compressible cementitious material positioned within annular gaps formed around at least a portion of the tunnel of the subterranean structure, wherein the cured compressible cementitious material is formed from a compressible cementitious composition comprising (i) water, (ii) a cementitious material, and (iii) a rubber material, in which the rubber material comprises at least 15 weight % of the composition based on the total weight of the composition.

Clause 12: The system of clause 11, wherein the subterranean structure comprises a tunnel liner formed around the tunnel, and the annular gaps are formed between the tunnel liner and a tunnel wall surface.

Clause 13: The system of clause 11 or 12, wherein the rubber material comprises from 40 weight % to 70 weight % of the composition, based on the total weight of the composition.

Clause 14: The system of any one of clauses 11-13, wherein the rubber material comprises a recycled crumb rubber, and wherein the recycled crumb rubber has a diameter of no more than 0.5 inches.

Clause 15: The system of any one of clauses 11-14, wherein the cementitious material comprises 50 weight % or less of the composition, based on the total weight of the composition, and a weight ratio of water to the cementitious material is less than 2:1, based on the total weight of the composition.

Clause 16: The system of any one of clauses 11-15, wherein the compressible cementitious composition further comprises fly ash, and wherein a weight ratio of a combined amount of the cementitious material and the fly ash to an amount of the rubber material is within a range of from 0.3:1 to 1:1, based on the total weight of the composition.

Clause 17: A compressible cementitious composition for filling annular gaps formed around a tunnel of a subterranean structure, the composition comprising: (i) water; (ii) a cementitious material; and (iii) a rubber material that comprises at least 15 weight % of the composition based on the total weight of the composition.

Clause 18: The composition of clause 17, wherein the rubber material comprises from 40 weight % to 70 weight % of the composition, based on the total weight of the composition.

Clause 19: The composition of clause 17 or 18, wherein the rubber material comprises a recycled crumb rubber.

Clause 20: The composition of clause 19, wherein the recycled crumb rubber has a diameter of no more than 0.5 inches.

Clause 21: The composition of any one of clauses 17-20, wherein the cementitious material is selected from the group consisting of Ordinary Portland cement, ground granulated blast furnace slag cement, and a combination thereof.

Clause 22: The composition of any one of clauses 17-21, wherein the cementitious material comprises 50 weight % or less of the composition, based on the total weight of the composition.

Clause 23: The composition of any one of clauses 17-22, wherein a weight ratio of water to the cementitious material is less than 2:1.

Clause 24: The composition of any one of clauses 17-23, wherein the compressible cementitious composition further comprises fly ash.

Clause 25: The composition of claim 24, wherein a weight ratio of a combined amount of the cementitious material and the fly ash to an amount of the rubber material is within a range of from 0.3:1 to 1:1.

DESCRIPTION OF THE INVENTION

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, the present invention includes a method of incorporating a compressible cementitious composition into a subterranean structure comprising a tunnel. As used herein, a "compressible cementitious composition" refers to a composition at least partially formed with a cementitious material and, when cured to form a hardened material, provides load-deformation characteristics allowing the material to at least partially compress in response to mechanical forces (e.g. compressive or deformation stresses). It will be appreciated that the compressible nature of the composition and resulting cured material helps prevent or at least reduces the damage to the tunnel liner when exposed to mechanical stresses.

As used herein, the terms "cure", "cured", and the like means that at least some of the components that form the compressible cementitious composition interact to form at least a partially hardened material. The composition typically cures under certain conditions such as, for example, under adequate moisture, temperature, and time conditions.

As previously described, the compressible cementitious composition is inserted into a subterranean structure. As used herein, a "subterranean structure" refers to a structure formed underneath the earth's surface. Non-limiting examples of subterranean structures include tunnels, boreholes, oil and gas wells, mines, and the like.

As also noted above, the subterranean structures associated with the present invention comprise tunnels. The tunnels can be formed from various tunneling methods and instruments known in the art including, for example, a tunnel boring machine. The tunnels associated with the present invention can also include a tunnel liner. The tunnel liners are typically installed immediately after the boring machine advances through the earth. The liners can be either cast in place or formed from precast segments attached together. The tunnel liners can help form the overall framework of the tunnel, as well as help resist pressure exerted onto the tunnel.

The tunnels of the subterranean structures previously described typically have annular gaps that are filled with cementitious material. As such, the method of the present invention comprises incorporating the compressible cementitious composition described in further detail herein into the annular gaps formed around the tunnels of the subterranean structures. When the tunnel also includes a tunnel liner, the compressible cementitious composition is incorporated into the annular gaps formed around the tunnel liners.

The compressible cementitious composition that is incorporated into the annular gaps comprises at least water, a cementitious material, and a rubber material. The compressible cementitious composition can also include additional components as described in further detail herein. Alternatively, the compressible cementitious composition can be formed from only water, a cementitious material, and a rubber material. It is appreciated that the above components (e.g., the cementitious material, the rubber material, and water) would represent the "total weight" of the composition.

The water used to form a portion of the compressible cementitious composition can be selected to have a particular weight ratio to the cementitious material. For example, a weight ratio of the water to the cementitious material in the compressible cementitious composition can be less than 2:1, or less than 1.5:1, or less than 1:1, or less than 0.9:1, or less than 0.8:1, based on the total weight of the composition. The weight ratio of the water to the cementitious material in the compressible cementitious composition can also be within a range of from 0.1:1 to less than 2:1, or from 0.1:1 to less than 1:1, or from 0.2:1 to 0.8:1, or from 0.3:1 to 0.7:1.

As previously described, the compressible cementitious composition also comprises a cementitious material. As used herein, a "cementitious material" refers to an inorganic cement material that will set, cure, and harden through a reaction with water. Non-limiting examples of suitable cementitious materials include Ordinary Portland cement, ground granulated blast furnace slag cement, and a combination thereof.

The compressible cementitious composition can comprise at least 20 weight %, at least 25 weight %, or at least 30 weight % of the cementitious material, based on the total weight of the composition. The compressible cementitious composition can also comprise 60 weight % or less, 50 weight % or less, or 40 weight % or less of the cementitious material, based on the total weight of the composition. The compressible cementitious composition can also comprise an amount of the cementitious material within a range of from 20 weight % to 60 weight %, or within a range of from 25 weight % to 50 weight %, or within a range of from 30 weight % to 40 weight %, based on the total weight of the composition.

As further indicated above, the compressible cementitious composition also comprises a rubber material. As used herein, a "rubber material" refers to a polymeric rubber component that exhibits a degree of elasticity. The rubber material can comprise natural rubber, synthetic rubber, or a combination thereof. Non-limiting examples of suitable rubber materials include polystyrene rubber, cis-1,4-polyisoprene rubber, styrene/butadiene copolymers, polybutadiene rubber, styrene/isoprene/butadiene rubber, butyl rubber, halobutyl rubber, and combinations thereof. The rubber material can also comprise recycled crumb rubber, such as recycled crumb rubber obtained from tires.

The compressible cementitious composition can comprise at least 15 weight %, at least 20 weight %, or at least 30 weight %, or at least 40 weight % of the rubber material, based on the total weight of the composition. The compressible cementitious composition can also comprise 70 weight % or less, 60 weight % or less, or 50 weight % or less of the rubber material, based on the total weight of the composition. The compressible cementitious composition can comprise an amount of the rubber material selected within a range of from 15 weight % to 70 weight %, or within a range of from 20 weight % to 70 weight %, or within a range of from 30 weight % to 70 weight %, or within a range of from 40 weight % to 70 weight %, or within a range of from 40 weight % to 60 weight %, or within a range of from 40 weight % to 50 weight %, based on the total weight of the composition.

The cementitious and rubber materials can also be selected such that the weight ratio of cementitious material to rubber material is within a certain range. For example, the cementitious and rubber materials can be selected such that the weight ratio of cementitious material to rubber material is within a range of from 0.3:1 to 1:0.3, or from 0.3:1 to 1:1, or from 0.3:1 to 0.5:1, or from 1.1:1 to 1:1.1 or 1:1.

The rubber materials can also have a certain size. For example, the rubber materials can have a diameter of no more than 0.5 inches, such as no more than 0.4 inches, no more than 0.1 inches, no more than 0.05 inches, or no more than 0.02 inches. The diameter of the rubber materials can be determined by measuring the average particle size of the rubber materials. As used herein, "average particle size" refers to the mean (average) particle size of the total amount of particles in a sample which can be determined by a Laser Diffraction Particle Size Analyzer, following the instructions described in the manual.

The compressible cementitious composition can also comprise additional components. For instance, the compressible cementitious composition can also comprise fly ash. As used herein, "fly ash" refers to fine residual particles generated in the combustion of materials such as coal. It will be appreciated that the fly ash can contain various materials depending on how the fly ash is formed but, in most instances, the fly ash used with the compressible cementitious composition contains at least silicon dioxide (amorphous and/or crystalline), aluminum oxide, and calcium oxide.

The compressible cementitious composition can comprise at least 20 weight %, at least 25 weight %, or at least 30 weight % of the fly ash plus the cementitious material, based on the total weight of the composition. The compressible cementitious composition can also comprise 60 weight % or less, 50 weight % or less, or 40 weight % or less of the fly ash plus the cementitious material, based on the total weight of the composition. The compressible cementitious composition can comprise an amount of the fly ash plus the cementitious material selected within a range of from 20 weight % to 60 weight %, or within a range of from 25 weight % to 50 weight %, or within a range of from 30 weight % to 40 weight %, based on the total weight of the composition.

It was found that the weight ratio of a combined amount of the cementitious material and the fly ash to an amount of the rubber material can provide a uniform reaction throughout the resulting hardened matrix by means of allowing the crumb rubber to remain evenly suspended throughout the entirety of the cementitious material. For example, it was found that such properties can be obtained by using a weight ratio of the cementitious material and the fly ash to an amount of the rubber material within a range of from 0.3:1 to 1:0.3, or from 0.3:1 to 1:1, or from 0.3:1 to 0.5:1, or from 1.1:1 to 1:1.1, or 1:1.

Other non-limiting examples of materials that can be used with the compressible cementitious composition of the present invention include air, plasticizers, fillers, flow and surface control agents, and other customary auxiliaries. The compressible cementitious composition can also be free of additional components. For instance, the compressible cementitious composition can be substantially free or completely free of additional components, including any of the previously described additional components, such as being substantially free or completely free of clays (e.g. bentonite clay) and/or foam beads (e.g. polymeric foam beads).

As used herein, the term "substantially free" means that the composition contains less than 1 weight %, based on the total weight of the composition. Further, the term "completely free" means that the composition contains less than 10 parts per billion (ppb), based on the total weight of the composition.

The previously described components can be mixed together using various methods to form the compressible cementitious composition. The components can be combined in any order, or simultaneously, and then mixed to form the compressible cementitious composition. The previously described components of the compressible cementitious composition can be combined and mixed such that the compressible cementitious composition has a viscosity that is able to unfairly suspend the rubber particles in the cementitious mixture while in the plastic state until the cementitious material hardens and cures to a solid.

After preparing the compressible cementitious composition, the composition can be incorporated into the annular gaps formed around the tunnel of the subterranean structure. The compressible cementitious composition can be incorporated into the annular gaps as the tunnel is being bored with a boring machine, such as by pumping the compressible cementitious composition into the annular gaps. When a tunnel liner is used, the tunnel liner is installed around the tunnel as the boring machine advances through the earth. The compressible cementitious composition is then pumped into the annular gaps formed between the tunnel liner and the tunnel wall. The compressible cementitious composition can be pumped into the annular gaps using known pumping devices and can be pumped into the annular gaps through grout holes, for example.

Once the compressible cementitious composition is incorporated into the annular gaps, the composition is allowed to cure to form a hardened cementitious material. The factors for curing the composition are adjusted based on the environment and other factors associated with the tunneling process. The factors that may be adjusted to control the curing process include, for example, curing time, temperature, moisture exposure, and the like.

Figure 1:
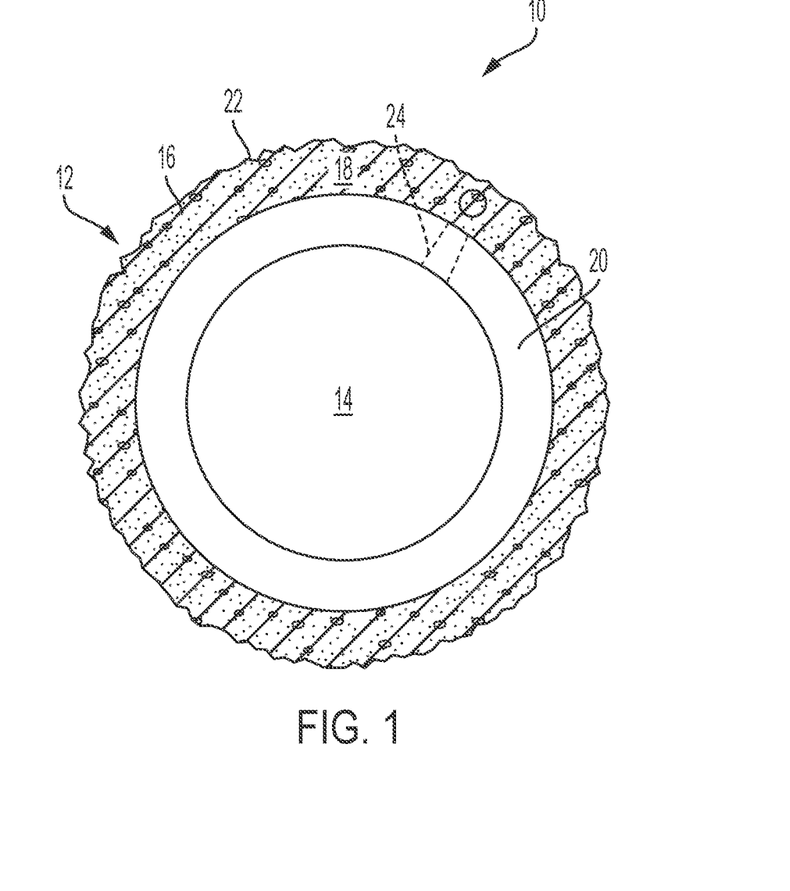
FIG. 1 is a front cross-sectional view of a tunnel comprising a compressible cementitious composition according to the present invention.

Referring to FIG. 1, the present invention is also directed to a subterranean system 10 that comprises a subterranean structure 12 comprising a tunnel 14 and a cured compressible cementitious material 16 positioned within annular gaps 18 formed around at least a portion of the tunnel 14 of the subterranean structure 12. The cured compressible cementitious material 16 can be formed from any of the previously described compressible cementitious compositions.

As further shown in FIG. 1, the subterranean structure 12 can also comprise a tunnel liner 20 formed around the tunnel 14 as previously described. As illustrated in FIG. 1, the annular gaps 18 can be formed between the tunnel liner 20 and a tunnel wall surface 22. Grout holes 24 can also be present where the compressible cementitious composition was pumped through and into the annular gaps 18.

It is appreciated that the present invention is also directed to any of the previously described compressible cementitious compositions.

It was found that the previously described method and subterranean system provided desired compressive and shear valve velocities, a cyclical loading and unloading of at least 5 cycles, and a volumetric rebound of at least 3% after being subjected to compressive forces and the release of those forces.

The following examples are presented to demonstrate the general principles of the invention. The invention should not be considered as limited to the specific examples presented. All parts and percentages in the examples are by weight unless otherwise indicated.

Example 1

Preparation of Compressible Cementitious Composition

A compressible cementitious composition was prepared from the components listed in Table 1.

TABLE 1

| Component | Actual Weight/ cubic yard | Weight % [1] |
|---|---|---|
| Ordinary Portland Cement (OPC) | 583.6 lbs | 26.09% |
| Crumb Rubber [2] | 1360.4 lbs | 60.87% |
| Water | 291.5 | 13.04% |

[1] Weight %'s are based on the total weight of the composition.
[2] Crumb rubber from CRM ® (Crumb Rubber Manufacturers), Colonie NY, 30 minus sieve least diameter (0.0232 inches) sized rubber particles obtained from reclaimed crumb tires.

The components listed in Table 1 were mixed through the process of first adding the dry materials to a laboratory concrete mixer and allowing the material to blend for 2 minutes. After the mixture appeared to be uniform, the water was added while the mixer was still turning. The mixture was allowed to mix for 3 minutes then allowed to sit for 2 minutes, followed by mixing for an additional 3 minutes before stopping the mixer and beginning the casting process. After the casting process was complete, the mixture formed a cured cylinder with the rubber dispersed throughout the cementitious material.

Example 2

Preparation of Compressible Cementitious Composition

A compressible cementitious composition was prepared from the components listed in Table 2.

TABLE 2

| Component | Actual Weight/ cubic yard | Weight % [1] |
|---|---|---|
| Ordinary Portland Cement (OPC) | 860 lbs | 36.40% |
| Crumb Rubber [2] | 891 lbs | 37.71% |
| Water | 611.5 lbs | 25.88% |

[1] Weight %'s are based on the total weight of the composition.
[2] Crumb rubber from CRM ® (Crumb Rubber Manufacturers), Colonie NY, 30 minus sieve least diameter (0.0232 inches) sized rubber particles obtained from reclaimed crumb tires.

The components listed in Table 2 were mixed through the process of first adding the dry materials to a laboratory concrete mixer and allowing the material to blend for 2 minutes. After the mixture appeared to be uniform, the water was added while the mixer was still turning. The mixture was allowed to mix for 3 minutes then allowed to sit for 2 minutes, followed by mixing for an additional 3 minutes before stopping the mixer. The mixture was then cast into a cylinder in which the rubber material was dispersed throughout the cementitious material.

Figure 2:
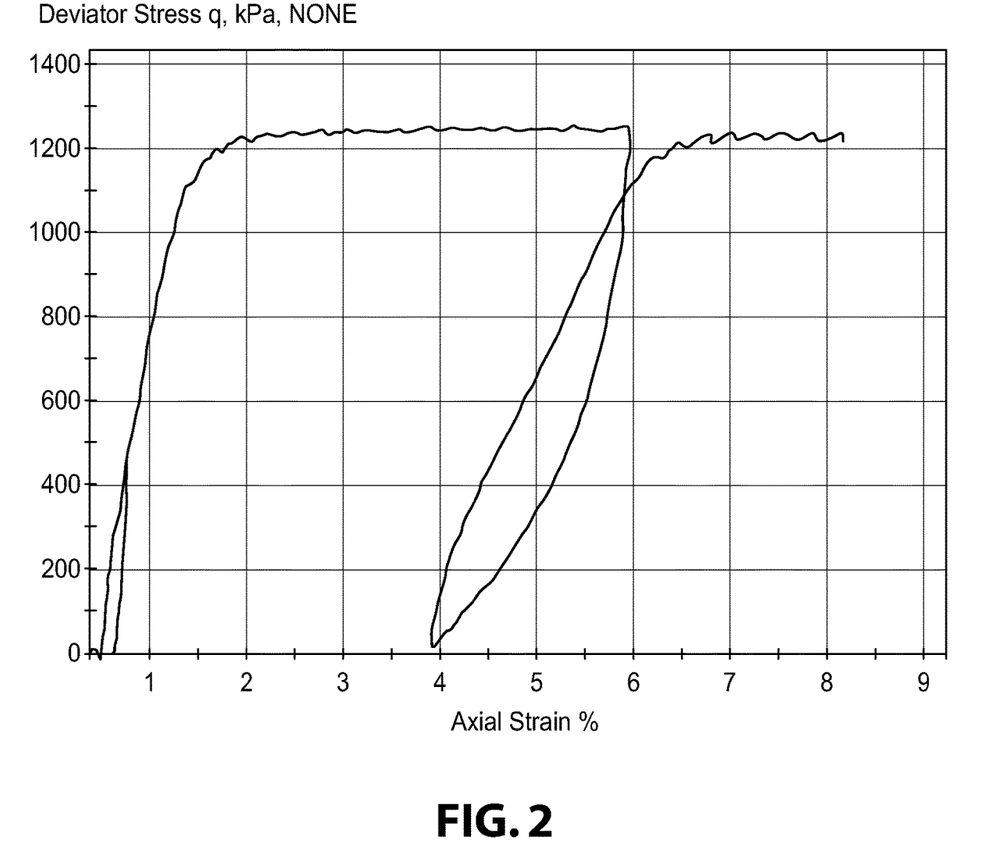
FIG. 2 is a graphical representation of the results of a deviator stress test illustrating the rebound effect of the present invention.

After forming and curing the cylinder for 28 days, the cylinder was placed into a triaxial GDS Instruments—DYNTTS Advanced Dynamic Triaxial Testing System. Pressure was first applied horizontally and then vertically from top to bottom to the cylinder. As pressure was applied, the axial strain to the cylinder was measured using ASTM D4767 CU Triaxial Comoression with the sample in an unsaturated condition. As shown in FIG. 2, the axial strain on the cylinder gradually increased as the pressure applied to the cylinder increased. As further shown in FIG. 2, the pressure on the cylinder was stopped when the axial strain reached 6%, which resulted in the axial strain decreasing by 2%. This shows that the cylinder formed from the composition of the present invention rebounded after being exposed to mechanical forces.

Figure 3:
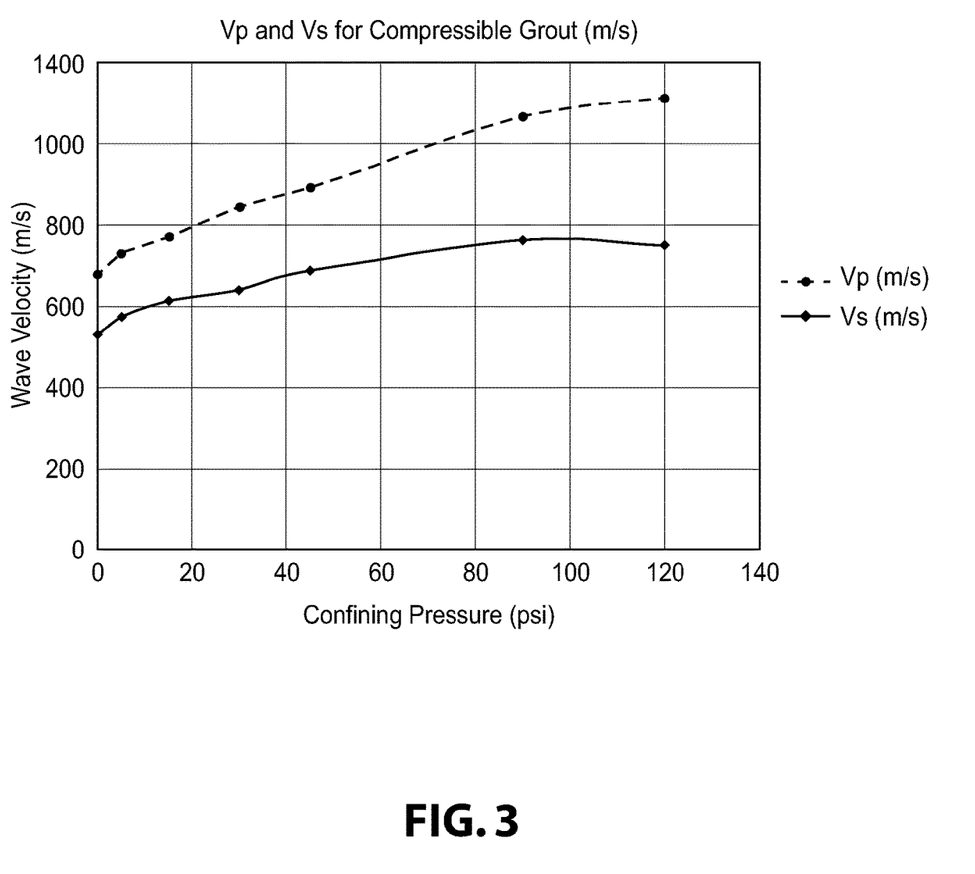
FIG. 3 is a graphical representation of the present invention to shear (Vs) and compression (Vp) waves at increasing confining pressures.

A second cylinder was formed following the same procedure previously described. The cylinder was then subjected to increasing vertical and horizontal confining pressures using a GDS Instruments—GDSBES, GDS Bender Element System using ASTM D8295 test method, such that the pressures were equal in all directions horizontally and vertically. As shown in FIG. 3, increasing pressures increased the shear (Vs) and compression (Vp) waves at constant rates through the cylinder. Based on the data in FIG. 3, the wave speeds are significantly less than would be found in surrounding rock, thereby showing that the composition of the present invention imparts a dampening effect on any earth shear and compression waves. This dampening effect reduces the total impact on tunnel walls, reducing the potential for permanent damage.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method of incorporating a compressible cementitious composition into a subterranean structure comprising a tunnel, the method comprising:
    (a) incorporating the compressible cementitious composition into annular gaps formed around the tunnel of the subterranean structure; and
    (b) allowing the compressible cementitious composition to cure to a hardened compressible cementitious material within the annular gaps,
    wherein the compressible cementitious composition comprises (i) water, (ii) a cementitious material, and (iii) a rubber material in which the rubber material comprises from 40 weight % to 70 weight % of the composition, based on the total weight of the composition.

2. The method of claim 1, wherein the rubber material comprises a recycled crumb rubber.

3. The method of claim 2, wherein the recycled crumb rubber has a diameter of no more than 0.5 inches.

4. The method of claim 1, wherein the cementitious material is selected from the group consisting of Ordinary Portland cement, ground granulated blast furnace slag cement, and a combination thereof.

5. The method of claim 1, wherein the cementitious material comprises 50 weight % or less of the composition, based on the total weight of the composition.

6. The method of claim 1, wherein a weight ratio of water to the cementitious material is less than 2:1, based on the total weight of the composition.

7. The method of claim 1, wherein the compressible cementitious composition further comprises fly ash.

8. The method of claim 7, wherein a weight ratio of a combined amount of the cementitious material and the fly ash to an amount of the rubber material is within a range of from 0.3:1 to 1:1.

9. The method of claim 1, wherein the subterranean structure comprises a tunnel liner formed around the tunnel, and the annular gaps are formed between the tunnel liner and a tunnel wall surface.

10. A subterranean system comprising:
    (a) a subterranean structure comprising a tunnel;
    (b) a cured compressible cementitious material positioned within annular gaps formed around at least a portion of the tunnel of the subterranean structure,
    wherein the cured compressible cementitious material is formed from a compressible cementitious composition comprising (i) water, (ii) a cementitious material, and (iii) a rubber material, in which the rubber material comprises from 40 weight % to 70 weight % of the composition, based on the total weight of the composition.

11. The system of claim 10, wherein the subterranean structure comprises a tunnel liner formed around the tunnel, and the annular gaps are formed between the tunnel liner and a tunnel wall surface.

12. The system of claim 10, wherein the rubber material comprises a recycled crumb rubber, and wherein the recycled crumb rubber has a diameter of no more than 0.5 inches.

13. The system of claim 10, wherein the cementitious material comprises 50 weight % or less of the composition, based on the total weight of the composition, and a weight ratio of water to the cementitious material is less than 2:1, based on the total weight of the composition.

14. The system of claim 10, wherein the compressible cementitious composition further comprises fly ash, and wherein a weight ratio of a combined amount of the cementitious material and the fly ash to an amount of the rubber material is within a range of from 0.3:1 to 1:1.

\* \* \* \* \*